United States Patent [19]
Kelley

[11] 3,733,797
[45] May 22, 1973

[54] NUT HARVESTER

[76] Inventor: George P. Kelley, 1102 E. Sixth, Okmulgee, Okla. 74447

[22] Filed: Dec. 30, 1970

[21] Appl. No.: 102,807

[52] U.S. Cl. ........................ 56/328 R, 56/16.5, 56/31
[51] Int. Cl. ............................................. A01d 51/00
[58] Field of Search ..................... 56/328 R, 31, 32, 56/13.1, 16.5; 15/345, 350, 352, 421, 415; 209/138, 139 R

[56] References Cited

UNITED STATES PATENTS

| 953,825 | 4/1910 | Gekeler | 15/421 |
| 2,668,330 | 2/1954 | Gieszl | 209/138 |
| 1,695,383 | 12/1928 | McCarthy | 209/139 R X |
| 2,740,153 | 4/1956 | Bishop | 56/32 X |
| 1,997,754 | 4/1935 | Sharp | 15/350 X |
| 3,352,094 | 11/1967 | Lemaire | 56/328 R |

FOREIGN PATENTS OR APPLICATIONS

| 15,555 | 9/1929 | Australia | 209/138 |
| 1,189,789 | 1/1961 | France | 15/421 |
| 620,542 | 3/1961 | Italy | 56/328 R |

Primary Examiner—Hugh R. Chamblee
Assistant Examiner—J. N. Eskovitz
Attorney—Head & Johnson

[57] ABSTRACT

A nut harvesting machine includes a motor and blower adapted to send high pressure air into a venturi producing a vacuum on one side thereof. Attached to the vacuum side is a flexible hose and nozzle arrangement adapted to pick up nuts or other fruit from the ground and cause same to travel into the venturi and thence to a separator where the air velocity is reduced to allow the nuts to drop into a receptacle while the trash is separated and blown away.

7 Claims, 6 Drawing Figures

PATENTED MAY 22 1973 3,733,797

INVENTOR.
GEORGE P. KELLEY
BY
Head & Johnson
ATTORNEYS

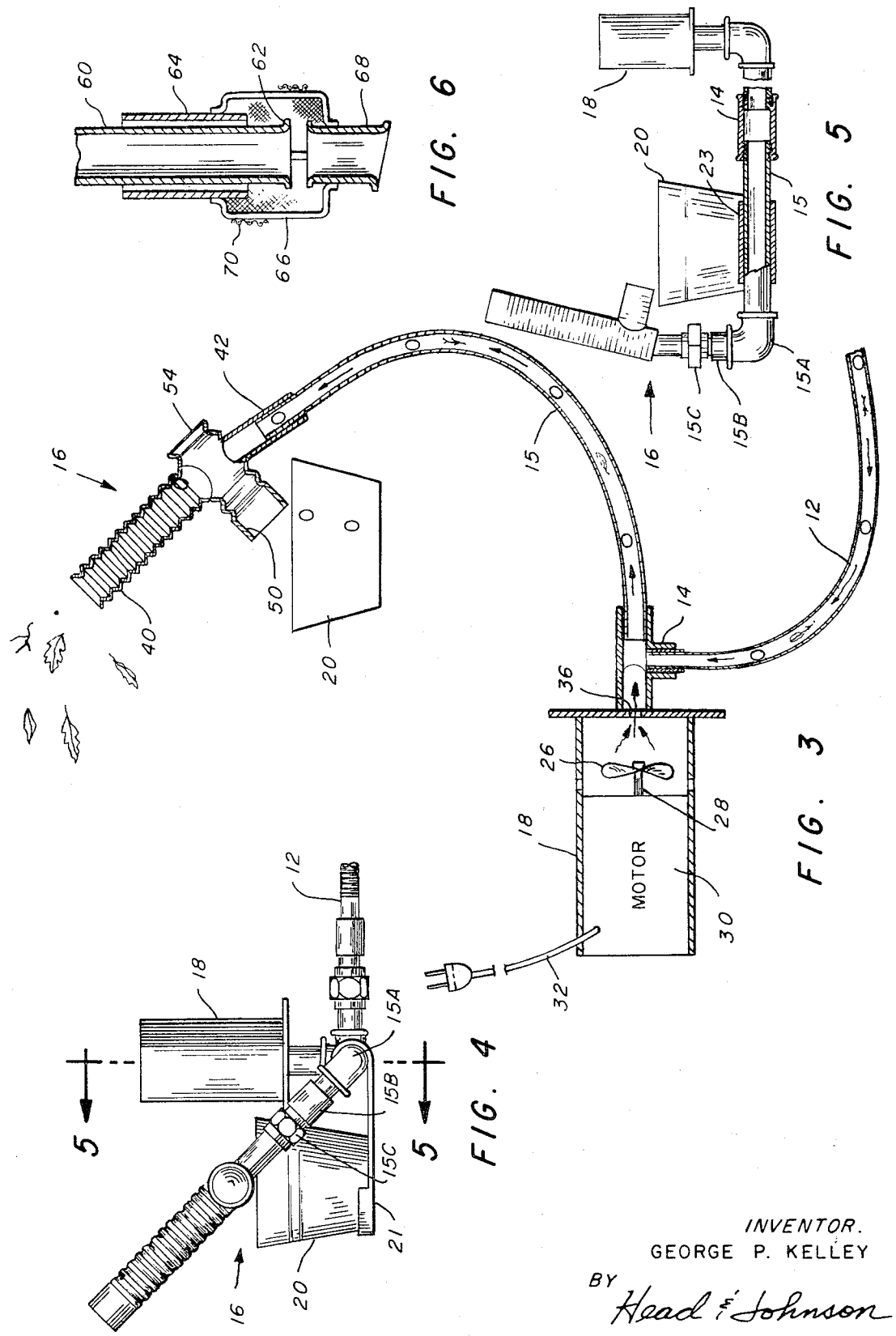

NUT HARVESTER

BACKGROUND OF THE INVENTION

This invention relates to nut harvesters and more particularly relates to a portable harvester for picking up pecans. The invention particularly is adaptable for use in small orchards and to pick up nuts left by larger volume tractor mounted harvesters.

Heretofore, nut harvesters have been manufactured and used for picking up nut crops after the nuts have fallen from the trees to the ground. Typically such harvesters are large expensive tractor mounted apparatus. In operation, such apparatus is transversed over the ground where the nuts are scooped or drawn into the inlet of the harvester and separated from the trash. The use of such equipment is limited and they leave a substantial percentage of the nuts on the ground. They are not very maneuverable and cannot be negotiated around the base of trees or into ditches, terraced areas or slight depressions in the ground. Their use is further limited by the spacing of the trees as in the case of native orchards. It is therefore an object of this invention to present a nut harvester which overcomes the aforementioned difficulties of presently manufactured devices.

It is a further object of this invention to present a small light weight portable nut harvester having a flexible hose and nozzle attachment adapted to pick up nuts from the ground and to convey them to a receptacle.

It is a further object of this invention to present a small portable light weight nut harvester incorporating therein means for separating the nut crop from twigs, leaves and other light trash which are picked up internally with the nut crop.

SUMMARY

Generally the nut harvester apparatus of this invention comprises a light weight motor and blower adapted to send high pressure air (motive fluid) into an eductor or venturi-like chamber creating a suction on one side thereof. Attached to the vacuum side is a flexible hose adapted to pick up nuts from the ground and cause same to travel into the venturi and thence to a separator where the air velocity is reduced sufficiently to allow the heavier pecans to drop from the end of the venturi into a receptacle while the light trash is separated and blown away.

DETAILED DESCRIPTION OF THE DRAWINGS

FIG. 1 is an overall view of the apparatus of this invention.

FIG. 2 of the drawings is a cross-sectional view taken along line 2—2 of FIG. 1.

FIG. 3 of the drawings is a cross-sectional view of the apparatus showing the internal workings of the apparatus during operation thereof.

FIG. 4 is a front elevational view of a modification of the invention.

FIG. 5 is a sectional view along the line 5—5 of FIG. 4.

FIG. 6 is a partial section view of an alternate pickup nozzle for use with the invention.

DETAILED DESCRIPTION OF THE PREFERRED EMBODIMENT

Figure 1:
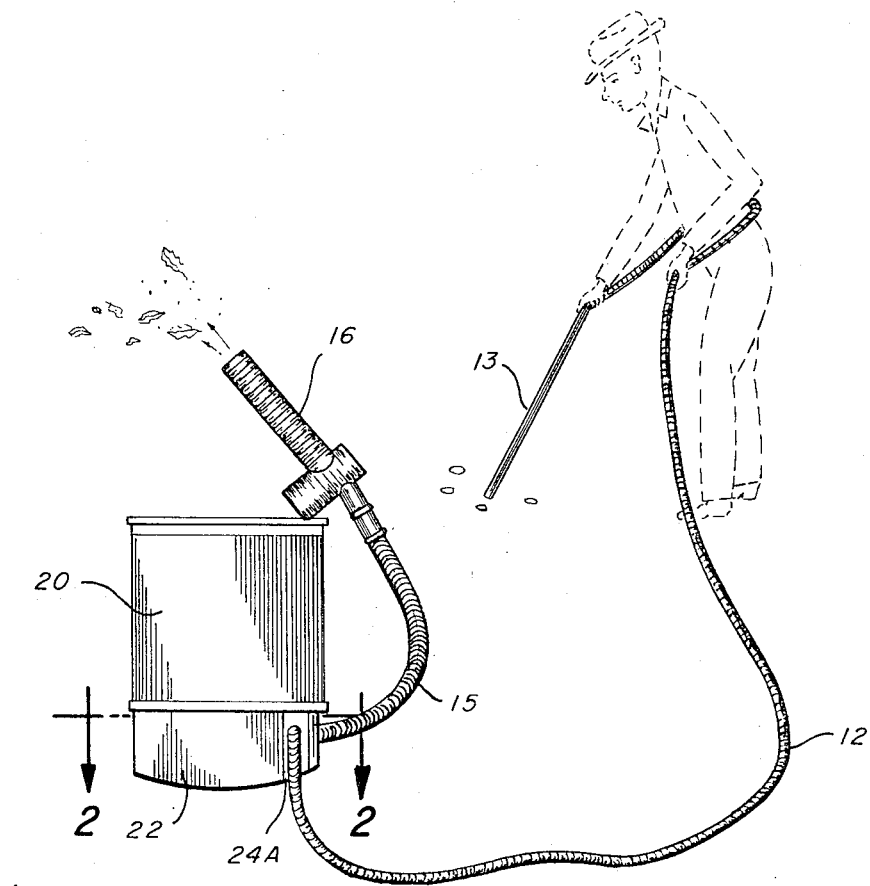
Figure 2:
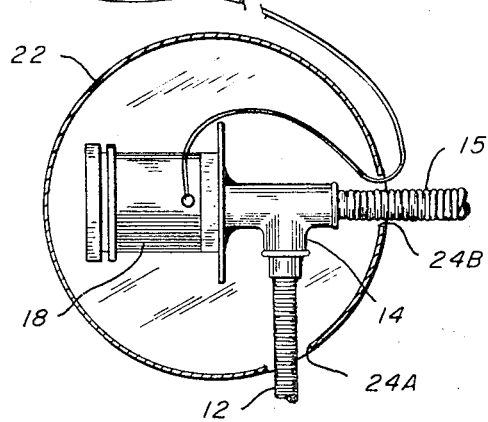

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Looking now at the drawings, the nut harvester of this invention includes a flexible nut pickup hose 12 terminating with a rigid wand 13 feeding into eductor 14 which discharges into separator 16 via discharge hose 15. A high velocity airstream is produced by blower means 18 flowing through eductor member 14 which creates a suction force or partial vacuum in pickup hose 12. Although the location of blower means 18 is by no means limited, a convenient location is directly beneath bin 20. A shroud 22 covers the blower means and has suitable openings 24A and 24B for the passage of the pickup hose 12 and discharge hose 15. Blower means 18 is a high speed air pump such as found in vacuum cleaners and includes a blower or fan blades 26 rotatably carried on the output shaft 28 of motor 30 which is supplied electricity from any source via leads 32. An internal combustion engine can be used to supply power. High velocity air is directed into the eductor 14 and discharge hose 15 through port 36.

Hoses 12 and 15 are composed of materials capable of accepting abrasiveness of the traveling nuts and trash yet flexibility of movement. Preferably the diameter of pickup hose 12 is only slightly larger than that of the nuts to be harvested so that the nuts will act to slightly block the flow path and assist the vacuum pull of nuts during passage therethrough. Discharge hose 15, on the other hand, may be slightly larger than hose 14, but is of greater rigidity so as to be capable of maintaining a desired position supporting separator 16 in its position over collection bin 20.

An important feature of this invention is separator 16 which comprises corrugated trash outlet 40 and transverse nut outlet 50. Inlet 42 which connects with the discharge hose 15 is angularly positioned relative to the axis of the outlet 40. The top 54 may be open as shown, or closed.

In operation, when motor 30 is energized to rotate fan blades 26, the high velocity airstream induced in the eductor 14 will, in accordance with the principles of a venturi, simultaneously create a vacuum force in pickup hose 12 discharging same into hose 15. Thus when an operator transverses the orchard floor with pickup hose 12, individual nuts as well as light debris such as leaves and twigs are drawn through wand 13, hose 12 into eductor 14 and thence through discharge hose 15 into the separator 16.

Upon entering the separator there is some reduction of velocity and pressure of the airstream. Because the discharge enters the trash outlet 40 at an angle the nuts and debris strike the upper inside of the outlet reducing the velocity of the heavier nuts which drop to the lower side away from the airstream rolling back into nut outlet 50 and into bin 20. The lighter debris continues outward of trash outlet 40. Although the corrugations of outlet 40 are shown these are not always necessary. It has been found that such corrugation aids in separation. The overall angular position of separator 16 is adjustable by the discharge hose 15 and will depend on the type of nuts being harvested, a greater angle to the ground for lighter nuts and lesser angle for heavier nuts.

In the event the pickup hose 12 becomes clogged it is easily cleared by placing one's hand over the discharge 42 into the separator through opening 54. This reverses air flow in the hose 12.

Referring now to the embodiment shown in FIGS. 4 and 5, this unit basically represents a simplified version which is adapted to be pulled along the ground. Like numerals will identify like or substantially similar parts shown in the previous drawings. As such the device comprises the basic parts of a pickup hose 12 which interconnects into an eductor-like arrangement 14 represented by the pipe tee. The discharge pipe 15, in this instance, is a rigid pipe member including an elbow 15A 15B, and connector 15C into the separator 16 as previously described. Receptacle bin 20 rests upon a plate 21, said plate being attached to a sleeve 23 which is movable around pipe 15. The operation and usage of the invention is identical to that previously described. Any angular adjustments of the separator 16 are accomplished by rotation of the elbow 15A about the pipe 15. The device is easily moved along the ground by pulling on the pickup hose 12.

Referring now to FIG. 6 an alternate embodiment of the pickup wand is described. In this embodiment the wand 60 includes a flared portion 62 at its end. A sleeve 64 includes a plurality of support arms 66 terminating with the main pickup nose piece 68 which in this embodiment is beveled as shown. Wrapped around the support braces 66 is a screen mesh 70 which prevents debris from entering in the pickup wand 60. In use, the operator presses the nose piece 68 against the ground which in turn moves upward into a substantially sealed contact with the flange 62 permitting passage of the nuts, etc., into the wand 60 for processing as previously described. In the event, however, the leaves or large twigs are also drawn into or cover the nose piece 68 once the wand is raised above the ground, the nose piece will drop, breaking the seal between the flange 62 and the suction at the end of the nose piece 68.

MODIFICATION

In some instances a plurality of pickup hose members 12 may be embodied with each apparatus to enable two or more operators to conveniently harvest the nut crop. Another embodiment includes the placement of a resilient pad opposite the juncture where the pickup hose enters the eductor to relieve the wear of the high velocity nuts traversing into the eductor pipe before they are picked up and carried into the discharge hose.

In addition, wheels or runners may be added to the apparatus to increase the portability thereof across the ground.

What is claimed is:

1. A nut harvester comprising:
   an eductor like member;
   means in flow communication with said eductor like member to provide high velocity motive fluid into said eductor like member to create a suction inlet;
   a nut and extraneous trash pickup hose connected to said suction inlet;
   a discharge hose connecting the outlet of said eductor like member to a separator, said separator comprising:
   a longitudinal trash outlet conduit to separate said trash from said nut and to direct said trash axially forward into the atmosphere,
   a nut outlet conduit substantially transverse to said trash outlet conduit and contiguous to the inlet of said trash outlet conduit, said nut outlet to direct nuts, separated from said trash, into the atmosphere for collection; and
   an inlet conduit connecting said discharge hose to said inlet of said trash outlet conduit at an acute angle to the forward axis of said trash outlet conduit.

2. A harvester of claim 1 wherein said pickup hose is flexible.

3. A harvester of claim 2 wherein the pickup end of said hose includes a rigid longitudinal wand.

4. A harvester of claim 1 wherein the pickup end of said hose includes a coaxial extension slidably attached thereto which, in one position, connects to said pickup end to maintain a vacuum at said extension end while in another position will interrupt the vacuum to said extension end.

5. A harvester of claim 1 including bin means to collect said nuts beneath said nut outlet conduit.

6. A harvester of claim 1 including means to adjust the angle of said separator relative to the ground.

7. A harvester of claim 1 including corrugations within the inner periphery of said trash outlet conduit.

* * * * *